US012559697B2

(12) United States Patent
Lin

(10) Patent No.: US 12,559,697 B2
(45) Date of Patent: Feb. 24, 2026

(54) METHODS AND SYSTEMS FOR EXTRACTING ADDITIONAL BENEFICIAL LIPID-SOLUBLE COMPOUNDS FROM PLANT MATERIALS IN ENVIRONMENTALLY SUSTAINABLE WAYS

(71) Applicant: YOUNG LIVING ESSENTIAL OILS, LC, Lehi, UT (US)

(72) Inventor: Hsueh-Kung Lin, Lehi, UT (US)

(73) Assignee: YOUNG LIVING ESSENTIAL OILS, LC, Lehi, UT (US)

( * ) Notice: Subject to any disclaimer, the term of this patent is extended or adjusted under 35 U.S.C. 154(b) by 617 days.

(21) Appl. No.: 17/930,690

(22) Filed: Sep. 8, 2022

(65) Prior Publication Data

US 2024/0084217 A1 Mar. 14, 2024

(51) Int. Cl.
| | |
|---|---|
| *C11B 9/02* | (2006.01) |
| *B01D 3/38* | (2006.01) |
| *C11B 1/10* | (2006.01) |

(52) U.S. Cl.
CPC ................ *C11B 9/025* (2013.01); *B01D 3/38* (2013.01); *C11B 1/104* (2013.01); *C11B 9/022* (2013.01); *C11B 9/027* (2013.01)

(58) Field of Classification Search
CPC .......... A23L 27/11; A23L 27/12; C11B 9/025; B01D 11/0284; B01D 11/288; B01D 11/265; B01D 11/257; B01D 11/28; B01D 11/211; B01D 11/203; B01D 2011/007
USPC ....................................................... 512/2, 1
See application file for complete search history.

(56) References Cited

U.S. PATENT DOCUMENTS

| | | | | |
|---|---|---|---|---|
| 2009/0306386 | A1 * | 12/2009 | Durand ................ | A61K 8/9794 |
| | | | | 546/41 |
| 2013/0039863 | A1 | 2/2013 | Yee et al. | |
| 2018/0354879 | A1 | 12/2018 | Rombaut et al. | |
| 2019/0142762 | A1 | 5/2019 | Mompon | |

FOREIGN PATENT DOCUMENTS

| | | | |
|---|---|---|---|
| EP | 4186575 | A1 | 5/2023 |
| FR | 2398799 | A1 | 2/1979 |
| FR | 3110422 | A1 † | 11/2021 |
| JP | 08105827 | A | 4/1996 |
| PT | 117613 | B | 5/2023 |
| WO | 2001007135 | A2 | 2/2001 |

OTHER PUBLICATIONS

Grazhdannikov et al, Selecting a Green Strategy on Extraction of Birch Bark and isolation of Pure Betulin using Monoterpenes, Apr. 8, 2018, ACS Sustainable Chem. Eng., 6, 6281-6288 (Year: 2018).*
Klein, DIY enfleurage: Make your own essential oils, Jun. 10, 2021, https://this.place/en/blogs/selfcare/diy-enfleurage?srsltd-afmBOorY RIUltgV1cFgIVOxp4hyOUVuVry5ekRtlYsV108s1xkC27 (Year: 2021).*
Kariuki, Whta's cold pressed extraction, Aug. 22, 2022, https://extractionmagazine.com/2022/08/22/whats-cold-pressed-extraction/ (Year: 2022).*
Bikovens et al., Chemical Composition of Lipophilic Extractives from Grey Alder (*Alnus incana*), Bioresources, vol. 8, Iss. 1, Nov. 28, 2012, pp. 350-357. entire document, bioresources.com, Latvia.
English translation of FR 2398799A1 prepared by Google Patents on Nov. 14, 2023 (https://patents.google.com/patent/WO2017208153A1/en?oq=WO+2017208153).
English translation of JP8105827A prepared by Google Patents on Nov. 14, 2023 (https://patents.google.com/patent/WO2017208153A1/en?oq=WO+2017208153).
ISA/US "International Search Report and Written Opinion," PCT Application No. PCT/US2023/072018, Mailed Date: Dec. 13, 2023, 13 Pages.
English translation of PT117613 prepared by Google Patents on Oct. 8, 2025 (https://patents.google.com/patent/PT117613A/en?oq=PT117613).
Daniela Nedeltcheva-Antonova, et al., "Exploring the Chemical Composition of Bulgarian Lavender Absolute (*Lavandula angustifolia* Mill.) by GC/MS and GC-FID", Plants 2022, 11, 3150, published on Nov. 17, 2022.†
Zoubida Chemat-Djenni, et al., (2010) "Carotenoid Extraction from Tomato Using a Green Solvent Resulting from Orange Processing Waste", Journal of Essential Oil Bear Plants, 13:2, 139-147 was published online on Mar. 12, 2013.†
Oskars Bikovens, et al., "Chemical Composition of Lipophilic Extractives from Grey Alder (*Alnus incana*)", Bioresources, vol. 8, Iss. 1, Nov. 28, 2012, pp. 350-357 was published on Nov. 28, 2012.†

* cited by examiner
† cited by third party

*Primary Examiner* — Jessica Whiteley
(74) *Attorney, Agent, or Firm* — TechLaw Ventures, PLLC; Terrence J. Edwards

(57) ABSTRACT

Methods and systems for extracting additional beneficial lipid-soluble heavy compounds from plant material in an environmentally sustainable manner. A method includes preparing a solution that includes a solvent comprising an essential oil and further includes a solute comprising a plant material. The method includes extracting one or more compounds from the plant material using the essential oil as part of the solvent.

23 Claims, 7 Drawing Sheets

200

Raw Plant Material
202

Prepare Raw Plant
Material For Distillation
204

Distillation
Process
206

Spent Plant
Material
208

Essential Oil Output
210

300

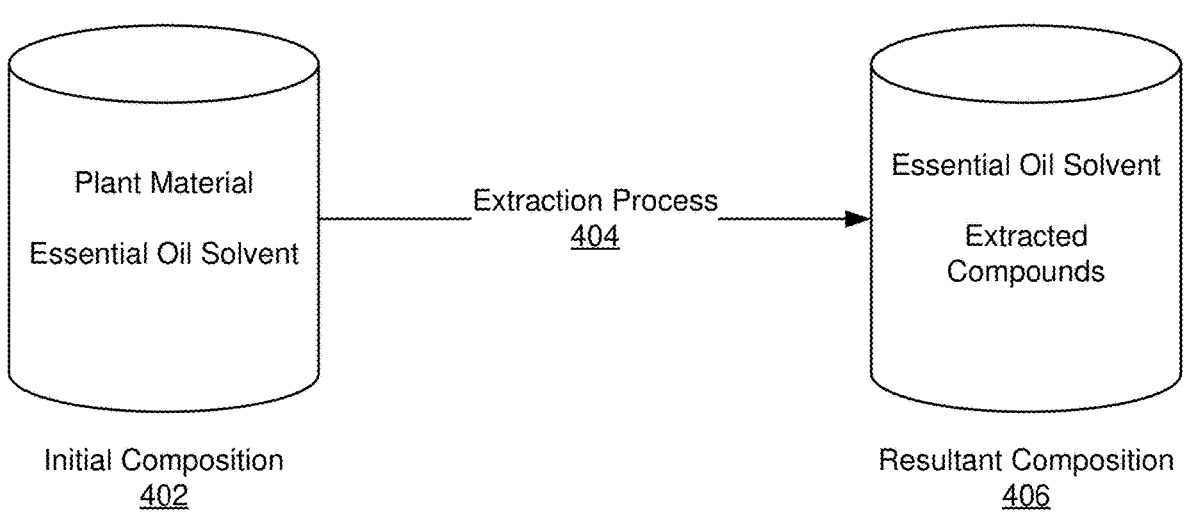
FIG. 4

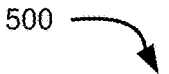

500

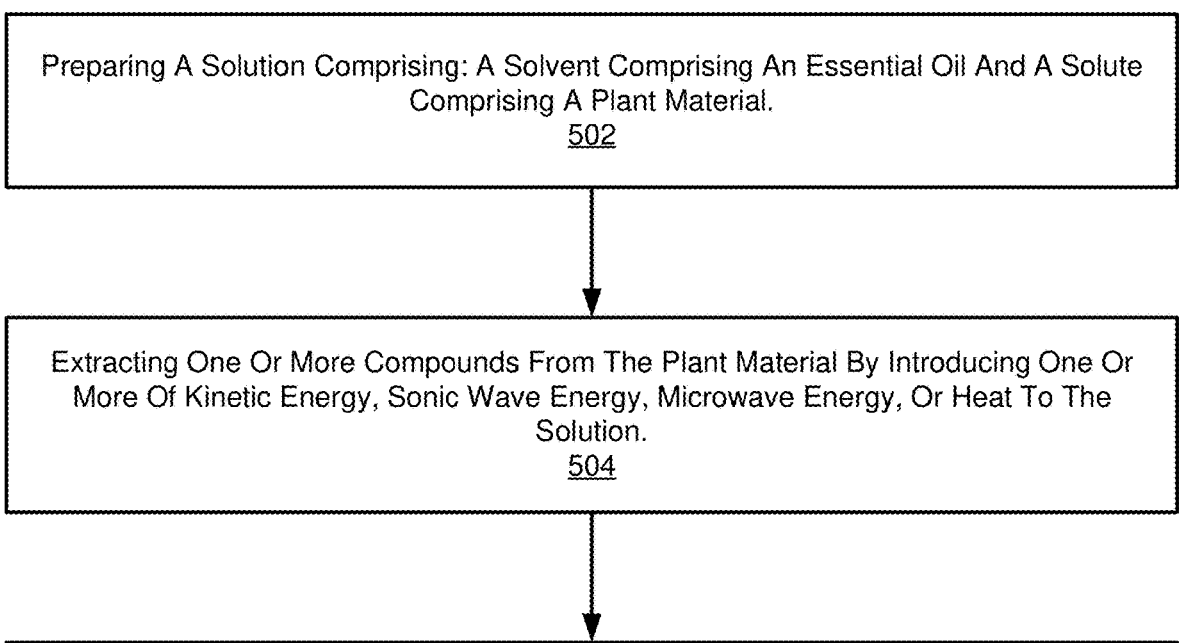

Preparing A Solution Comprising: A Solvent Comprising An Essential Oil And A Solute Comprising A Plant Material.
502

Extracting One Or More Compounds From The Plant Material By Introducing One Or More Of Kinetic Energy, Sonic Wave Energy, Microwave Energy, Or Heat To The Solution.
504

In Response To Extracting The One Or More Compounds, Filtering A Resultant Solution To Remove Solid Plant Material.
506

FIG. 5

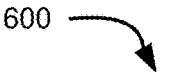
600
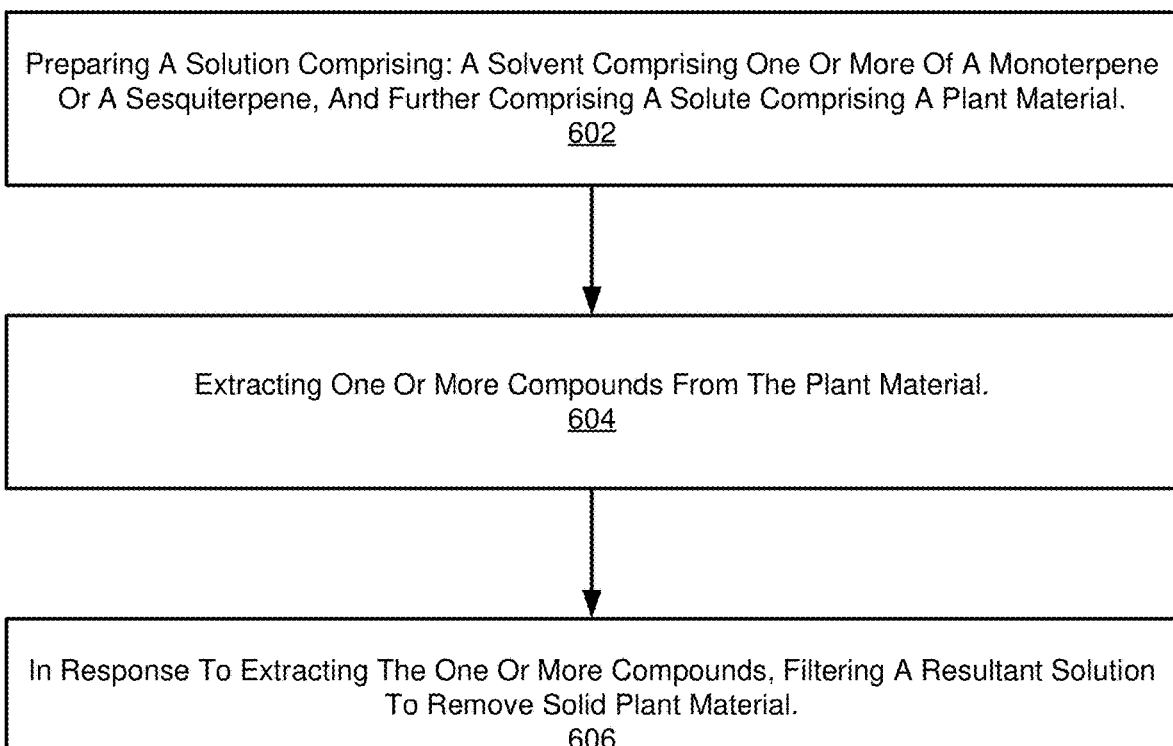
Preparing A Solution Comprising: A Solvent Comprising One Or More Of A Monoterpene Or A Sesquiterpene, And Further Comprising A Solute Comprising A Plant Material.
602
Extracting One Or More Compounds From The Plant Material.
604
In Response To Extracting The One Or More Compounds, Filtering A Resultant Solution To Remove Solid Plant Material.
606
FIG. 6

METHODS AND SYSTEMS FOR EXTRACTING ADDITIONAL BENEFICIAL LIPID-SOLUBLE COMPOUNDS FROM PLANT MATERIALS IN ENVIRONMENTALLY SUSTAINABLE WAYS

TECHNICAL FIELD

The disclosure relates generally to methods of preparation and particularly relates to methods and systems for extracting additional beneficial lipid-soluble compounds from plant materials in environmentally sustainable ways.

BACKGROUND

Extraction in chemistry is a separation process consisting of detaching a substance from a matrix. Extraction includes liquid-liquid extraction and solid phase extraction. Extraction is driven by chemical potential, i.e., once the extraction is complete, the overall system of chemical components will be in a more stable configuration with reduced free energy. Extraction and distillation processes are commonly performed to retrieve certain molecules and chemical compounds from plant material.

Plant-based extracts are increasingly important additives in numerous products across various industries. Plant-based extracts may be included in foods, nutritional supplements, cosmetics, essential oils, skincare, pharmaceuticals, pesticides, household cleaners, and so forth. Plants include numerous molecules that are known to exhibit a variety of biological functions including antimicrobial and antioxidant activity, and it can be beneficial to extract these molecules and use them in a purer as well as more concentrated and effective form.

However, traditional methods for plant-based extraction and distillation fail to effectively retrieve the additional heavier lipid-soluble compounds that are present in the plant. These heavier lipid-soluble compounds can be biologically active and provide numerous benefits to users, and it is desirable to extract the additional heavier lipid-soluble compounds following distillation processes rather than discard them with the spent plant material that usually ends up as ground cover and/or in landfills.

Additionally, some traditional medicines, including traditional Chinese herbal medicine, Ayurveda, and others rely on water-soluble compounds extracted from plants. These traditional medicine modalities typically extract water-soluble compounds through drying plant materials and then recombining the dehydrated plant materials with water. These techniques fail to extract the lipid-based compounds from the plant material, which include essential oils. Essential oils provide numerous health benefits and can be an important component of a natural medical treatment. The extraction techniques described herein may be combined with traditional medicine techniques to provide additional health benefits to the patient and improve treatment outcomes.

In light of the foregoing, disclosed herein are methods and systems for improved extraction of additional beneficial lipid-soluble compounds from plant materials in environmentally sustaining ways.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 4 is a schematic diagram of a process flow for extracting the heavier additional beneficial lipid-soluble compounds from a plant material using an essential oil solvent;

FIG. 5 is a schematic flow chart diagram of a method for extracting beneficial heavier lipid-soluble compounds from a plant material while reducing waste and without introducing harmful chemicals into the resultant extraction; and FIG. 6 is a schematic flow chart diagram of a method for extracting beneficial heavier lipid-soluble compounds from a plant material while reducing waste and without introducing harmful chemicals into the resultant extraction.

DETAILED DESCRIPTION

Figure 1:
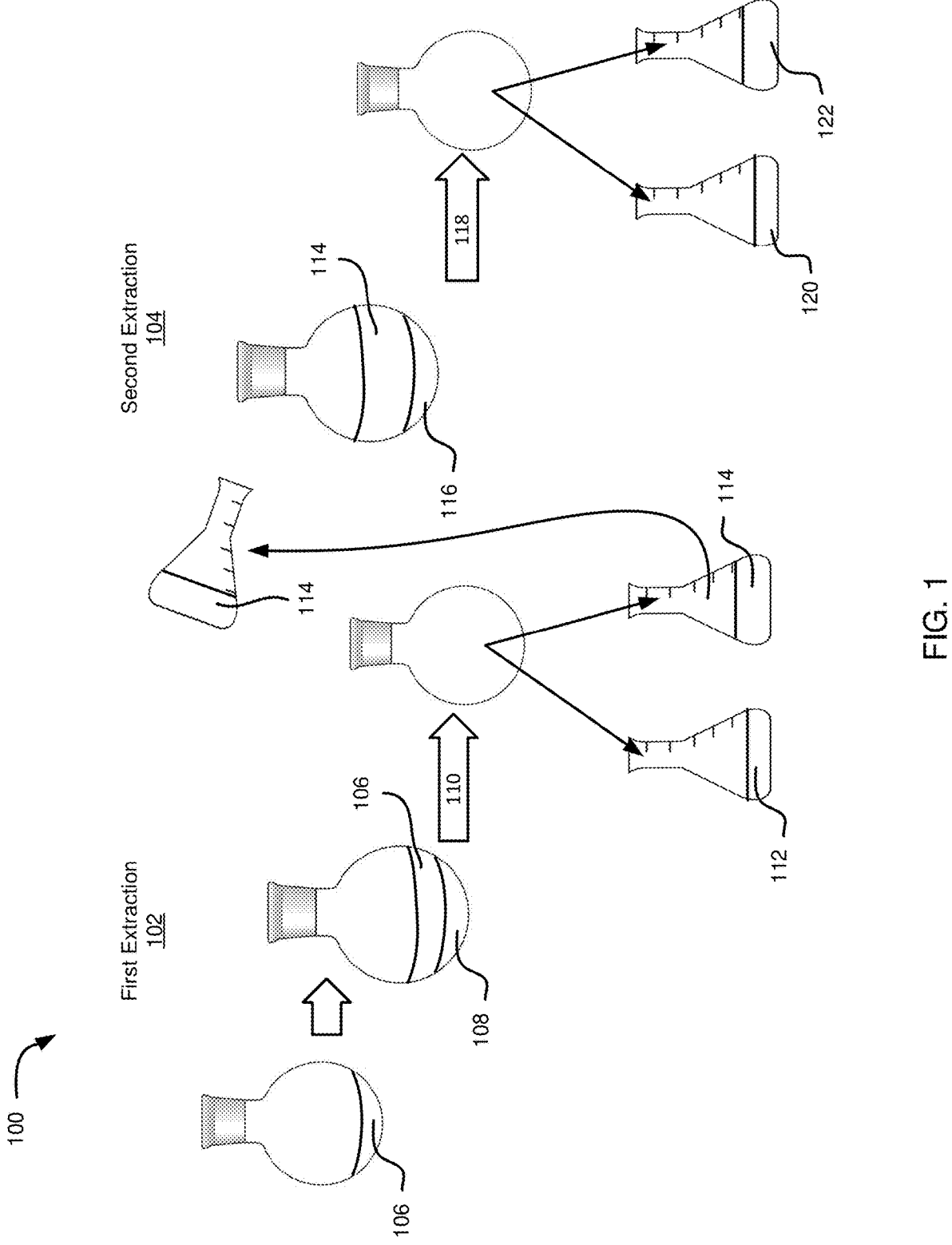
FIG. 1 is a schematic illustration of a process flow for extracting the heavier additional beneficial lipid-soluble compounds from a plant material using an essential oil solvent.

Disclosed herein are methods and systems for extracting additional beneficial lipid-soluble heavier compounds from a plant material. Traditional extraction methods fail to extract heavy lipid-soluble compounds having a molecular weight exceeding a traditional extraction threshold. The traditional extraction threshold defines a molecular weight that cannot be efficiently extracted using steam distillation, hydro-distillation, or traditional solvent-based extraction methods. Most traditional extraction methods fail to efficiently extract compounds having a molecular weight greater than or equal to 250 g/mol. The extraction methods and systems described herein address the deficiencies of traditional extraction methods and effectively extract appreciable quantities of the heavier beneficial lipid-soluble molecules.

The methods and systems described herein leverage an essential oil solvent to extract the heavier lipid-soluble compounds from a plant material. The essential oil solvent may include one or more of monoterpenes, sesquiterpenes, or diterpenes, which may be extracted using traditional extraction methods such as steam distillation, hydro-distillation, carbon dioxide extraction, cold-press extraction, enfleurage, or other traditional solvent-based extraction methods. The essential oil solvent successfully extracts the heavier lipid-soluble compounds from the plant material, including, for example, triterpenes (molecular weight in excess of 550 g/mol), other heavy terpene compounds, vitamins, carotenoids, flavonoids, phenolic acids, stilbenes, and others. The essential oil solvent may specifically be implemented to extract additional beneficial lipid-soluble and biologically active compounds.

The methods and systems described herein are further implemented to retrieve additional compounds from "spent" plant material that has previously undergone extraction processing. The spent plant material may be deficient in lighter compounds, such as monoterpenes, sesquiterpenes, volatile compounds, and other molecules with a "lighter" molecular weight. In traditional systems, the spent plant material is discarded, and the remaining heavier molecules are never retrieved. The methods and systems for heavy lipid-soluble molecule extraction described herein are implemented to reduce waste and retrieve additional molecules and nutrients from plant materials.

Essential oils are commonly used for aromatherapy, personal care, household cleaning solutions, and nutritional care. Essential oils may also be used as pesticides, herbicides, antimicrobials, and in food. Essential oils may be provided to a user for topical administration, aromatic inhalation, ingestion, intravenous delivery, intramuscular delivery, or other delivery means. Essential oils are prepared to be as pure and potent as possible.

Essential oils are traditionally distilled in a single process. In traditional methods, raw plant material, such as flowers, leaves, wood, bark, roots, seeds, or peel, undergo extraction processing using traditional extraction methods such as steam distillation, hydro-distillation, traditional solvent-based extraction methods, carbon dioxide extraction, enfleurage, or cold-press extraction. The extraction process is typically selected based on the delicacies, boiling point, and other physical and biological characteristics of the plant that the essential oil is being extracted from.

In many cases, the raw plant materials are processed using steam distillation or hydro-distillation. Steam distillation includes disposing the raw plant materials into an alembic (distillation apparatus) over water. As the water is heated, the steam passes through the plant material and vaporizes the volatile compounds. Hydro-distillation includes immersing the plant materials into water and vaporizing the water. When the water vaporizes, volatile compounds are extracted from the plant material. When the water vapor cools through a coil, the volatile compounds to a liquid state, which is then collected in the receiving vessel.

In some cases, essential oils are extracted using solvent extraction. Some flowers contain too little volatile oil to undergo expression, but their chemical components are too delicate and easily denatured by the high heat used in steam distillation. In these cases, a solvent such as hexane or supercritical carbon dioxide is used to extract the oils. Extracts from hexane and other hydrophobic solvents are called concretes, which are a mixture of essential oil, waxes, resins, and other lipophilic plant material. Although highly fragrant, concretes include large quantities of non-fragrant waxes and resins. Often, another solvent, such as ethyl alcohol, is used to extract the fragrant oil from the concrete. The alcohol solution is chilled at a ultracold temperature, which causes the waxes and lipids to precipitate out. The precipitates are then filtered out and the ethanol is removed from the remaining solution by evaporation, vacuum purge, or both, leaving behind the absolute.

Supercritical carbon dioxide is used as a solvent in supercritical fluid extraction. This method can avoid petrochemical residues in the product and the loss of some components when steam distillation is used. Supercritical carbon dioxide does not yield an absolute directly. The supercritical carbon dioxide will extract both the waxes and the essential oils that make up the concrete. Subsequent processing with liquid carbon dioxide, achieved in the same extractor by merely lowering the extraction temperature, will separate the waxes from the essential oils. This lower temperature process prevents the decomposition and denaturing of compounds. When the extraction is complete, the pressure is reduced to ambient, and the carbon dioxide reverts to a gas.

Before the methods and systems for heavy molecule extraction are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified ingredients, materials, or steps and those that do not materially affect the basic and novel characteristic or characteristics of the claimed disclosure.

As used herein, "effective amount" means an amount of an ingredient or a component of the product that is nontoxic, but sufficient to provide the desired effect and performance at a reasonable benefit/risk ratio attending any dietary supplement or product. For example, an effective amount of a vitamin or mineral is an amount sufficient to prevent a deficiency thereof and to reduce the incidence of some adverse effects.

As used herein, a component or ingredient of a composition may include any suitable form of the component or ingredient, such as, for example, an extract, a powder, a tincture, an absolute, an essential oil, a paste, a dehydrated form, and so forth. It should be appreciated that any suitable form or combination of a component or ingredient may be used unless otherwise specified.

As used herein, an "extract" includes any substance obtained from a raw material. An extract may be obtained from a blossom, fruit, root, whole plant, leaf, or other component of an agricultural or horticultural component. An extraction may be obtained through expression, absorption, maceration, distillation, grinding, dehydration, and so forth. An extract may be stored in a solvent such as ethanol or water or may be stored in a dry form such as a powder.

As used herein, an "essential oil" is a lipid-soluble compound derived from a plant material. The essential oil may specifically include volatile or aromatic chemical compounds extracted from the plant material. Essential oils may be extracted using steam distillation, hydro-distillation, expression, solvent extraction, absolute oil extraction, resin tapping, wax embedding, cold pressing, carbon dioxide extraction, enfleurage, and other extraction means. Essential oils may include one or more terpenes and may specifically include one or more monoterpenes and sesquiterpenes.

Essential oils include, but are not limited to, oils extracted from basil, bergamot, black pepper, black seed, blue cypress, blue spruce, blue tansy, blue yarrow, fleabane, cannabis, cardamom, carrot seed, cedarwood, chamomile, cinnamon bark, cistus, citronella, clary sage, clove, copaiba, Corsican cypress, davana, dorado azul, elemi, eucalyptus, fennel, frankincense, geranium, ginger, goldenrod, grapefruit, helichrysum, hinoki, hong kuai, hyssop, lemon, jasmine, juniper, kunzea, lavender, ledum, lemon, lemon myrtle, lemon verbena, lemongrass, lime, magwort, manuka, marjoram, mastrante, melaleuca, myrrh, myrtle, neroli, nutmeg, Ocotea, orange, oregano, palmarosa, palo santo, patchouli, peppermint, petitgrain, pine, ravintsara, rose, rosemary, sandalwood, shell ginger, rue, sage, spearmint, tangerine, tea tree, thyme, tsuga, turmeric, valerian, vanilla, vetiver, wintergreen, xiang mao, and ylang ylang.

In some cases, an essential oil does not include carrier oils. Common carrier oils include, for example, sweet almond oil, coconut oil, olive oil, sesame oil, jojoba oil, grapeseed oil, vegetable oil, and hemp oil.

Unless defined otherwise, all technical and scientific terms used herein have the same meanings as commonly understood by one of ordinary skill in the art to which this disclosure pertains and belongs.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Referring now to the figures, FIG. 1 is a schematic illustration of a method 100 for extracting heavy lipid-soluble molecules with an essential oil solvent. It should be understood that the illustration in FIG. 1 is merely a schematic drawing, such that relative densities, viscosities, and solubilities of various components may not be accurate in all implementations. The method 100 may specifically be implemented to extract one or more molecules that cannot be effectively extracting using traditional means due to having a higher molecular weight. The method 100 may be performed in connection with other extraction methods, including solvent extraction and distillation.

The method 100 includes a first extraction 102 and a second extraction 104. The first extraction 102 is performed to retrieve the solvent that will be used for the second extraction 104. The first extraction 102 includes disposing a first solvent 106 and a first plant material 108 into a vessel. The first extraction 102 includes performing one or more first extraction steps 110. The first extraction 102 results in retrieving a first byproduct 112 and an essential oil solvent 114. The byproduct 112 may be discarded, used, or implemented in further extraction processes. The essential oil solvent 114 comprises one or more molecules extracted from the first plant material 108.

The second extraction 104 includes disposing the essential oil solvent 114 and a second plant material 116 in a vessel. The second extraction 104 includes performing one or more second extraction steps 118. The second extraction 104 results in retrieving a second byproduct 120 and a heavy molecule composition 122.

The first extraction 102 may include a solvent-based extraction process as shown in FIG. 1, or it may alternatively include another means of extracting, such as steam distillation, hydro-distillation, carbon dioxide extraction, maceration, enfleurage, cold press extraction, water distillation, or other means of retrieving the essential oil solvent 114.

In an implementation, the first extraction 102 is a solvent extraction process for retrieving the essential oil solvent 114 from the first plant material 108. In this implementation, the first solvent 106 includes a food-grade solvent such as ethanol, benzene, dimethyl, or hexane to isolate the oils within the first plant material 108. This solvent extraction process may be selected based on the delicacy of the first plant material 108 and whether the first plant material 108 is able to withstand other extraction methods such as steam distillation.

In another implementation, the first extraction 102 is not a solvent-based extraction process, and instead includes a steam distillation extraction process. This implementation is described further in connection with FIG. 3, wherein the first plant material 108 is extracted by passing hot steam through the first plant material 108 to vaporize one or more volatile compounds within the first plant material 108. In many cases, steam distillation is a desirable extraction process because the resultant extracted compounds are highly pure and may be safe for human use and consumption.

In another implementation, the first extraction 102 includes a carbon dioxide extraction process. Carbon dioxide extraction is a type of essential oil extraction that uses carbon dioxide as the first solvent 106. The process of carbon dioxide extraction begins by pressuring the carbon dioxide until it liquifies. The liquid carbon dioxide is used as the first solvent 106 to extract oils from the first plant material 108. When the carbon dioxide has absorbed the oils, the extract is returned to regular pressure, which causes the carbon dioxide to revert back into a gas. Carbon dioxide itself is colorless, odorless, flavorless, and non-toxic, but carbon dioxide extraction processes may not result in the purest or safest essential oil product. Because carbon dioxide extraction takes place in a sealed chamber, it recovers the whole oil from the first plant material 108, including any pesticide residue. Thus, the resulting essential oil solvent 114 may include a greater quantity of pesticides and/or may need to undergo additional processing.

In another implementation, the first extraction 102 includes an enfleurage extraction process. Enfleurage is a process that uses odorless fats that are solid at room temperature to capture essential oils within plant material. Enfleurage may be implemented as "cold" enfleurage or "hot" enfleurage. In cold enfleurage, a large plat is smeared with a layer of fat and allowed to set. Plant material is then placed on the fat and the essential oils within the plant material are allowed to diffuse into the fat over the course of one or more days. The process may be repeated by replacing the plant material until the fat has reached a desired degree of essential oil saturation. In hot enfleurage, solid fats are heated and plant material is stirred into the fat. Spent plant material is repeatedly strained from the fat and replaced with raw plant material until the fat is sufficiently saturated with essential oils.

In another implementation, the first extraction 102 includes a cold-press extraction process, which may alternatively be referred to as "expression." Cold-press extraction may specifically be used to isolate oils from citrus peels. The cold-press extraction process includes puncturing the first plant material 108 to rupture oil sacs within the first plant material 108. When this occurs, the essential oils from the first plant material 108 may run down into a collection area. The first plant material 108 may then be mechanically pressed to squeeze out the remaining oils and juices. The resulting oils and juices will include solid elements which may be separated from the liquids. The oils will separate from the juice layer to create the final essential oil product, which is used as the essential oil solvent 114 in the second extraction 104.

In another implementation, the first extraction 102 includes extraction protocols that use hydro-distillation. Hydro-distillation uses plant materials packed in a still compartment soaked in water, which is then steamed or boiled in the entire pot to extract oil and bioactive compounds from the water. The vapor mixture of water and oil is condensed by indirect cooling with water. The condensed mixture flows from a condenser to a separator, where oil and bioactive compounds are separated automatically from the water.

In the event the first extraction 102 is a solvent-based extraction process, the first solvent 106 may include a food-grade solvent such that the resulting essential oil solvent 114 does not include harmful chemicals that may deteriorate the quality of the resulting heavy molecule composition 122. The first solvent 106 may specifically include a polar solvent such as methanol, ethanol, or acetone. The first solvent 106 may include an organic solvent with low polarity such as hexanes, toluene, dichloromethane, or diethyl ether.

The first plant material 108 may include raw plant materials such as leaves, petals, stems, seeds, roots, bark, woods, resin, and so forth. The first plant material 108 includes any suitable plant material comprising an essential oil that may be extracted and used as the essential oil solvent 114. The first plant material 108 may include, for example: plants from the carrot family such as anise, dill, or angelica; plants from the ginger family such as cardamom and ginger; plants from the laurel family such as cinnamon and camphor; plants from the mint family such as peppermint, rosemary, or thyme; plants from the myrtle family such as clove or allspice; plants from the orchid family such as vanilla; plants from the nutmeg family such as nutmeg or mace; and plants from the pepper family such as black pepper.

The first plant material 108 may include seeds or other components of vegetables or fruits. The first plant material 108 may include edible or non-edible plant materials that comprise one or more edible or non-edible oils. The first plant material 108 may include leaves from one or more varieties of plants, such as bay, bay laurel, mint, cajeput, cinnamon, eucalyptus, geranium, kanuka, lemon myrtle, manuka, myrtle, niaouli, patchouli, petitgrain, Ravensara, saro, tea tree, tobacco, or violet. The first plant material 108 may include one or more components of flowering herbs such as basil, catnip, clary sage, green tea, holy basil, hyssop, lavender, lavandin, lemon balm, marjoram, oregano, peppermint, rosemary, sage, spearmint, thyme, or yarrow. The first plant material 108 may include flowers, petals, or buds from various plants such as boronia, Cananga, chamomile, clove, davana, helichrysum, jasmine, linden blossom, neroli, rose, tagetes, tuberose, or ylang ylang. The first plant material 108 may include woods such as wood from amyris, cedarwood, palo santo, rosewood, or sandalwood. The first plant material 108 may include other plant components such as bark, needles, grass, resin, balsam, gum, berries, fruit, citrus rinds, roots, seeds, or moss. The first plant material 108 may be derived from, for example, cassia, cinnamon, cannabis, cypress, fir, scotch pine, spruce, citronella, lemongrass, palmarosa, benzoin, peru balsam, elemi, frankincense, galbanum, gurjum, myrrh, allspice, black pepper, juniper berry, may chang, bergamot, grapefruit, lemon, lime, mandarin, orange, tangerine, yuzu, angelica, ginger, spikenard, vetiver, ambrette, anise, cacao, cardmon, carrot, coffee bean, coriander, cumin, dill, fennel, nutmeg, parsley, oakmoss, and so forth.

The first extraction steps 110 are dependent on the methods implemented for the first extraction 102. In an implementation, the first extraction 102 is a solvent-based extraction as shown in FIG. 1. Solvent extraction is a process in which compounds are separated based on their relative solubilities. Solvent extraction involves using a solvent (i.e., the first solvent 106), which is a fluid having the ability to dissolve another substance. Then first solvent 106 may be disposed in the solid, liquid, or gas state. The first solvent's 106 molecules pull apart the solute's molecules (in this case, the molecules of the first plant material 108), and eventually the solute's molecules become evenly distributed throughout the solvent. The first solvent 106 and one or more compounds from the first plant material 108 may form two or more immiscible phases (i.e., two or more fluids that do not dissolve in one another). The two or more immiscible phases may separate because the layers differ in polarity or orientation. The order of the phases and determination of whether a particular fluid is on top or on the bottom is determined by the relative densities of the fluids.

In a solvent-based extraction method, the first extraction steps 110 may include applying kinetic energy to the composition by way of shaking, stirring, microwave energy, or sonication. The first extraction steps 110 may additionally include applying electromagnetic energy sonic wave or heat to the composition by way of light emissions or a heat source. This may prompt the first solvent 106 to extract one or more molecules from the first plant material 108.

The byproduct 112 may include one or more of the first solvent 106 or components left over from the first plant material 108. The byproduct 112 may include a mixture of solid and liquid components. The essential oil solvent 114 includes one or more essential oils and other compounds extracted from the first plant material 108. The essential oil solvent 114 may specifically include one or more terpenes or terpenoids present in the first plant material 108.

The essential oil solvent 114 includes purified essential oils extracted from the first plant material 108. These extracted essential oils are then used as the solvent for the second extraction 104. Thus, the essential oils from the first plant material 108 are used as a solvent to extract molecules form the second plant material 116. In contrast with traditional solvent-based extraction methods, the essential oil solvent 114 is not discarded or burned off as a byproduct. In these traditional methods, the solvent is often toxic when ingested. This presents numerous issues, particularly because trace amounts of the solvent will typically remain in the resultant solution, and further because the solvent byproduct presents numerous environmental concerns. By contrast, in the methods described herein, the essential oil solvent 114 is saved and may remain in the heavy molecule composition 122 in combination with one or more essential oils or heavy molecules that are extracted from the second plant material 116.

The essential oil solvent 114 may include one or more monoterpenes or monoterpenoids and may further include one or more sesquiterpenes or sesquiterpenoids. The essential oil solvent 114 may include trace amounts of diterpenes/diterpenoids and/or triterpenes/triterpenoids. The essential oil solvent 114 may include one or more flavonoids or polyphenols. The essential oil solvent 115 may include a plurality of different lipid-soluble compounds in varying amounts.

The second plant material 116 may include any of the plant materials discussed in connection with the first plant material 108. The second plant material 116 may include the same type of plant material (i.e., the same plant and/or the same component of a plant) used in connection with the first plant material 108. The second plant material 116 and first plant material 108 may include different plants and/or different components of plants. In some implementations, the first plant material 108 and the second plant material 116 are the same component of the same plant, and the second plant material 116 may in fact be the first plant material 108 reused after undergoing the first extraction. In some implementations, the second plant material 116 may comprise plants that do not have essential oils and/or are not known for or used for obtaining essential oils, but still comprise heavier lipid-soluble molecules that may be extracted from the plants.

In an implementation, the first plant material 108 undergoes the first extraction, and only lighter-weight molecules are extracted from the first plant material, such as volatile compounds, aromatics, and lighter weight terpenes. The byproduct 112 of the first extraction 102 may include spent plant material with at least a portion of the lighter weight molecules extracted (the extracted molecules are present in the essential oil solvent 114). This spent plant material may be reused as the second plant material 116 used in the second extraction. Thus, the essential oil solvent 114 extracted from the first plant material 108 is used to extract additional, heavier molecules from the same plant material during the second extraction 104 reducing waste and loss of beneficial plant compounds.

In an implementation, the second plant material 116 is "spent" plant material, i.e., plant material that has undergone some processing, such as an extraction process or distillation process. The spent plant material may be deficient in some lighter weight molecules that were removed during the prior extraction and/or distillation process. However, the spent plant material may still include one or more compounds having a heavier lipid-soluble molecular weight. The heavier molecular weight of the remaining compounds prevents them from being extracted using traditional extraction and/or distillation methods. The second extraction 104 uses the essential oil solvent 114 to further process the spent plant material to extract the remaining lipid-soluble compounds having the heavier molecular weight.

The first plant material 108 and the second plant material 116 may include components from one or more of the same plants or different plants. The method 100 may be implemented to combine lighter weight molecules from the first plant material 108 (i.e., the molecules present in the essential oil solvent 114) with heavier molecules from the second plant material 116. Thus, the method may be implemented to create new combinations of plant-based compounds that are not found in nature. For example, one or more lighter weight volatile compounds from a first plant may be combined with one or more heavier terpenes present in a second plant. This creates a novel combination of plant-based molecules that may exhibit synergistic properties when provided to a user.

Each of the first plant material 108 and the second plant material 116 may include component from any plant species. Each of the first plant material 108 and the second plant material 116 may include raw plant materials, spent plant materials, or raw plant materials that have undergone some processing to prefer for an extraction procedure. The second plant material 116 may or may not include an essential oil and may include other biologically important compounds.

The heavy molecule composition 122 includes at least a portion of the essential oil solvent 114 that was extracted during the first extraction 102. The heavy lipid-soluble molecule composition 122 further includes one or more heavier lipid-soluble molecules extracted from the second plant material 116 during the second extraction 104. The ratios and quantities of the essential oil solvent 114 and the second plant material 116 may be optimized such that the heavy molecule composition 122 does not undergo further separation and/or other processing and may instead be packaged as a final product comprising components of the first plant material 108 and the second plant material 116.

The compounds having a "heavier molecular weight" comprise a molecular weight that exceeds a mass threshold for extracting the compound by traditional extraction or distillation methods. The heavier molecular weight prevents the compound from being extracted from a plant material through one or more of steam distillation, hydro-distillation, carbon dioxide extraction, enfleurage, cold-press extraction, or traditional solvent-based extraction methods. The traditional solvent-based extraction methods implement a solvent that is removed following the extraction process. Traditional solvent-based extraction methods may implement a solvent comprising, for example, methanol, ethanol, acetone, hexanes, toluene, dichloromethane, diethyl ether, and so forth.

The second extraction steps 118 are implemented to aid the essential oil solvent 114 in extracting one or more heavy compounds from the second plant material 116. The second extraction steps 118 include weighing out a desired quantity of the essential oil solvent 114 and disposing the same into a reaction vessel. The second extraction steps 118 including weighing out a desired quantity of the second plant material 116 or spent biomass (i.e., spent plant material) that has previously been processed for extraction. The second plant material 116 may be ground into a fine powder and then disposed in the reaction vessel along with the essential oil solvent 114. The ratio of the essential oil solvent 114 to the second plant material 116 is optimized for extracting heavy compounds from the second plant material 116. The solution within the reaction vessel may include from about 20 wt. % to about 55 wt. % of the essential oil solvent 114, and from about 35 wt. % to about 60 wt. % of the plant material. It should be appreciated that the relative quantities of the essential oil solvent 114 and the plant material 116 will be optimized and adjusted depending on the procedures being followed in the second extraction steps 118 and/or the identity of the compounds within the solution.

The second extraction steps 118 may include one or more steps for introducing energy into the reaction vessel. The second extraction steps 118 may include heating the solution. The reaction temperature may be selected and optimized based on the identity of the compounds within the solution, and specifically based on whether the compounds in the solution are prone to breaking down or becoming inactivated in the presence of heat. The second extraction steps 118 may include introducing kinetic energy into the solution by way of sonication, agitating the solution, introducing microwave energy, stirring the solution, and so forth.

The solution comprising the essential oil solvent 114 and the plant material 116 may become a slurry mixture. After the solution is agitated and/or allowed to rest for a sufficient amount of time such that the essential oil solvent 114 has extracted at least a portion of the compounds within the second plant material 116, then the slurry mixture may be filtered to remove fine particles and other solids that remain from the second plant material 116. The slurry mixture may be filtered through an ultrafine filter, such as a 20-micron to 60-micron pore size filter.

The method 100 will extract heavy compounds from the second plant material 116. These heavy compounds may include heavier terpenes or terpenoids such as triterpenes or triterpenoids. Additionally, these heavier compounds may include vitamins, carotenoids, flavonoids, phenolic acids, stilbenes, and others. The essential oil solvent 114 is specifically implemented to extract lipid-soluble and biologically active compounds with a molecular weight that exceeds a traditional extraction threshold.

Figure 2A:
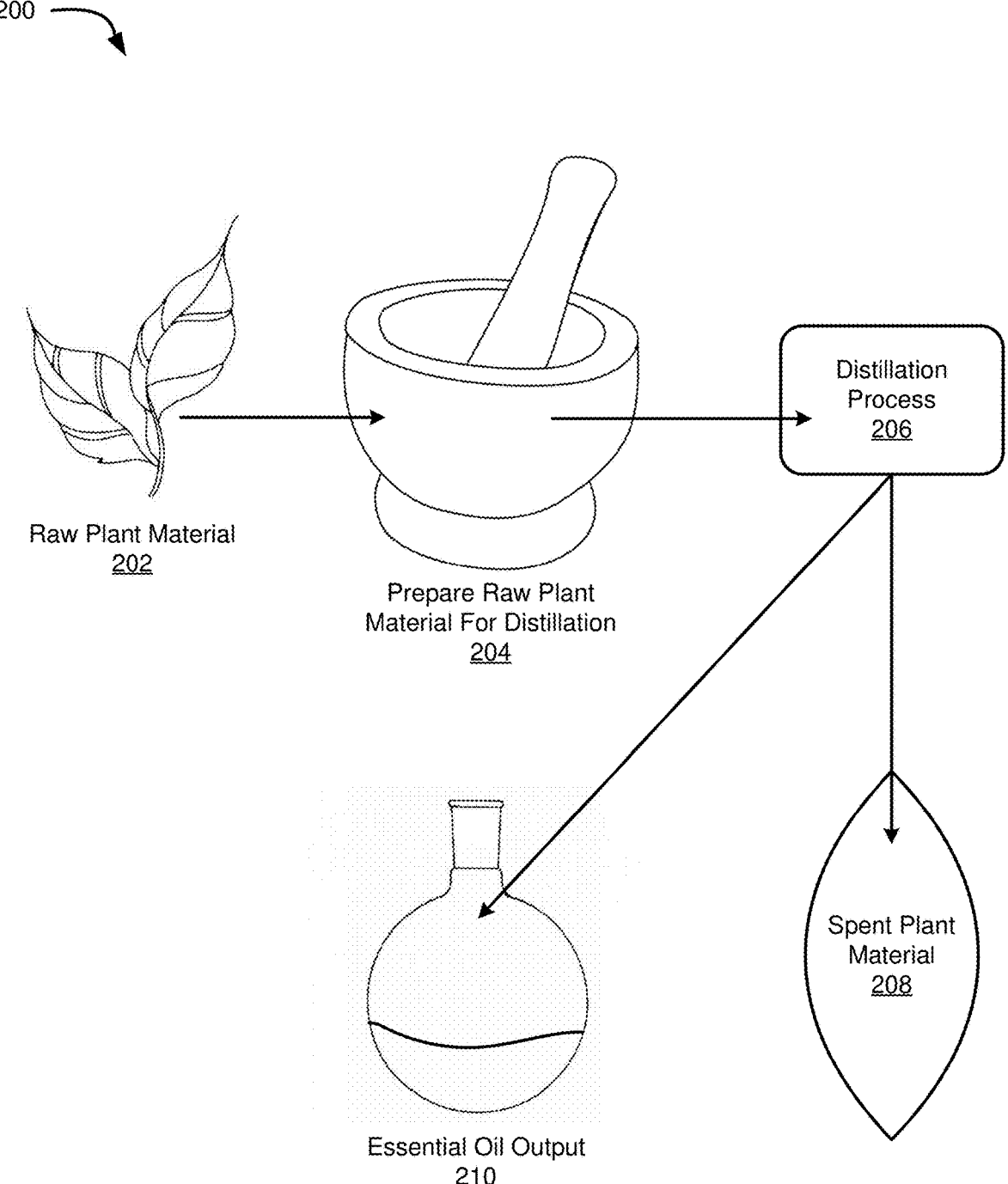
FIG. 2A is a schematic illustration of a process flow for extracting an essential oil from a raw plant material through distillation to produce an essential oil output and spent plant material.
Figure 2B:
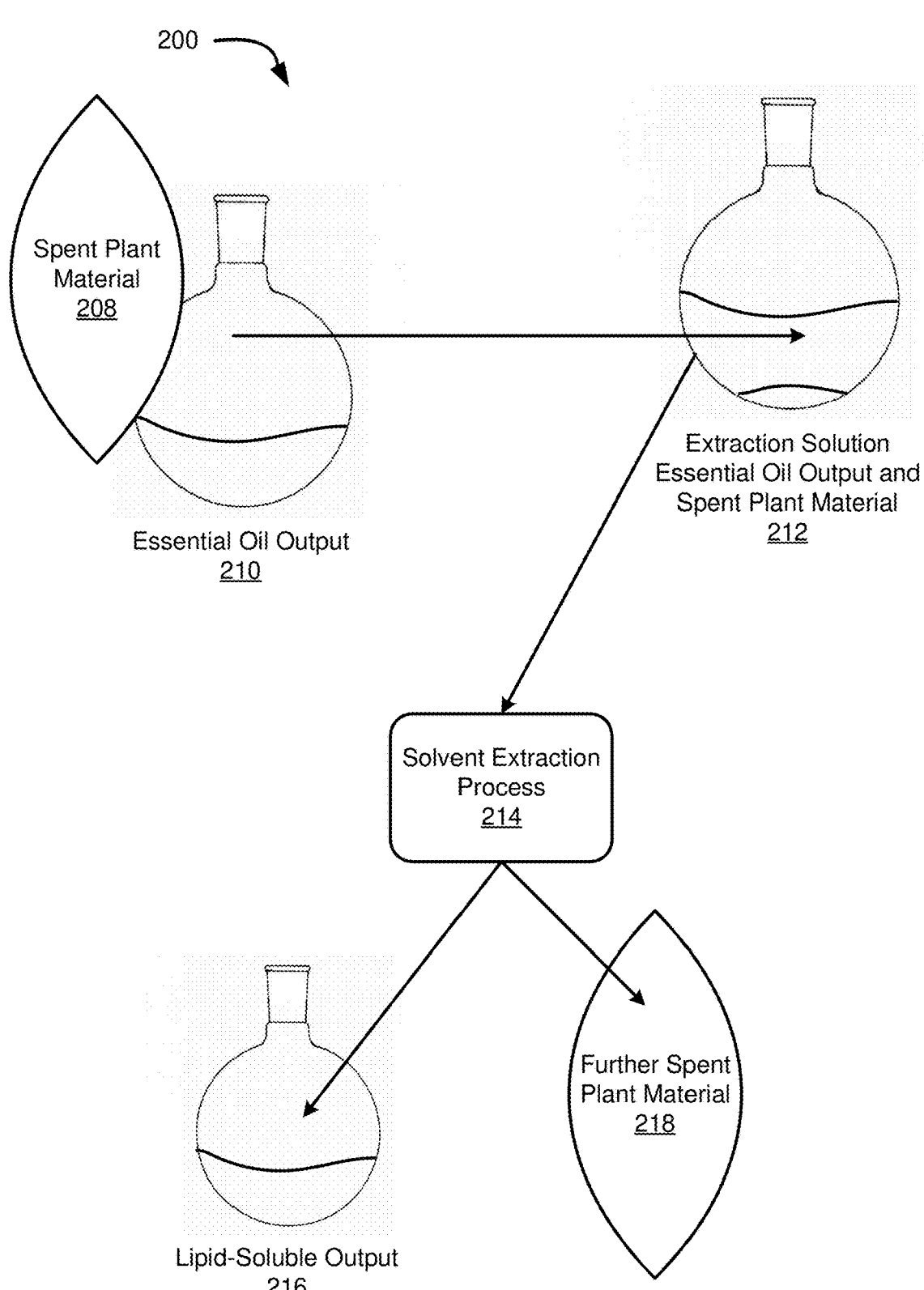
FIG. 2B is a schematic illustration of a process flow for extracting additional beneficial lipid-soluble compounds from spent plant materials using an essential oil solvent.

FIGS. 2A and 2B illustrate a process flow 200 for extracting additional beneficial lipid-soluble compounds from a plant material in an environmentally sustainable manner that reduces overall waste and does not introduce harmful compounds into the resultant extraction. The process flow 200 includes a steam distillation or hydro-distillation component (illustrated in FIG. 2A) and further includes a solvent extraction component (illustrated in FIG. 2B).

The process flow 200 includes extracting one or more compounds from raw plant material 202. The raw plant material 202 may include any of the plant materials discussed in connection with the first plant material 108 illustrated in FIG. 1. The raw plant material 202 is prepared for distillation at 204, which may include grinding the raw plant material 202 to a suitable size or preparation by another suitable means. It should be understood that the preparation at 204 will be dependent on the type of raw plant material 202.

The process flow 200 includes a distillation process 206 wherein an essential oil output 210 is extracted from the raw plant material 202. The distillation process 206 further results in a spent plant material 208. The spent plant material 208 comprises components of the raw plant material 202 that were not extracted by the distillation process 206. The spent plant material 208 is deficient in one or more compounds that are now present in the essential oil output 210. The spent plant material 208 may specifically be deficient in one or more lipid-soluble compounds, which may specifically include monoterpenes/monoterpenoids, sesquiterpenes/sesquiterpenoids, and trace amounts of diterpenes/diterpenoids. These lipid-soluble compounds are now present in the essential oil output 210.

The process flow 200 continues and the spent plant material 208 is combined with the essential oil output 210 to generate an extraction solution 212. The extraction solution 212 may include the same spent plant material 208 and essential oil output 210 retrieved in FIG. 2A. The extraction solution 212 may alternatively include spent plant material 208 from other extraction processes, including distillation processes, solvent-based extraction processes, cold press extraction processes, carbon dioxide extraction processes, and so forth. In some cases, the essential oil output 210 and the spent plant material 208 may be derived from different plants such that the resultant lipid-soluble output 216 may include lighter-weight molecules retrieved from a first plant (i.e., present in the essential oil output 210) and heavier molecules retrieved from a second plant (i.e., extracted from the spent plant material 208).

The spent plant material 208 is reused in the extraction solution 212 after one or more compounds have previously been extracted from the spent plant material 208. In most cases, the spent plant material 208 will be discarded as waste after undergoing an extraction process. The process flow 200 represents improvements over traditional methods because the spent plant material 208 is reused to extract additional beneficial compounds in an environmentally sustainable manner that reduces overall waste.

The extraction solution 212 undergoes the solvent extraction process 214. The solvent extraction process 214 includes any of the solvent-based extraction techniques described herein, and may specifically include applying one or more of kinetic energy, sonic waves, microwave or heat to the extraction solution 212 over a certain time period. The solvent extraction process 214 results in a lipid-soluble output 216 and further spent plant material 218. The further spent plant material 218 is deficient in further compounds relative to the original spent plant material 208. The lipid-soluble output 216 includes components of the essential oil output 210 and additionally includes further lipid-soluble compounds that were extracted from the spent plant material 208. The additional lipid-soluble compounds may generally comprise a heavier molecular weight when compared with those included in the essential oil output 210. The lipid-soluble output 216 may include one or more compounds having a molecular weight that exceeds a distillation extraction threshold (with the distillation extraction threshold referring to a molecular weight that is prohibitively large and prevents the compound from being retrieved with distillation methods). The lipid-soluble output 216 may specifically include one or more diterpenes/diterpenoids or triterpenes/triterpenoids that could not be extracted during the distillation process 206.

Figure 3:
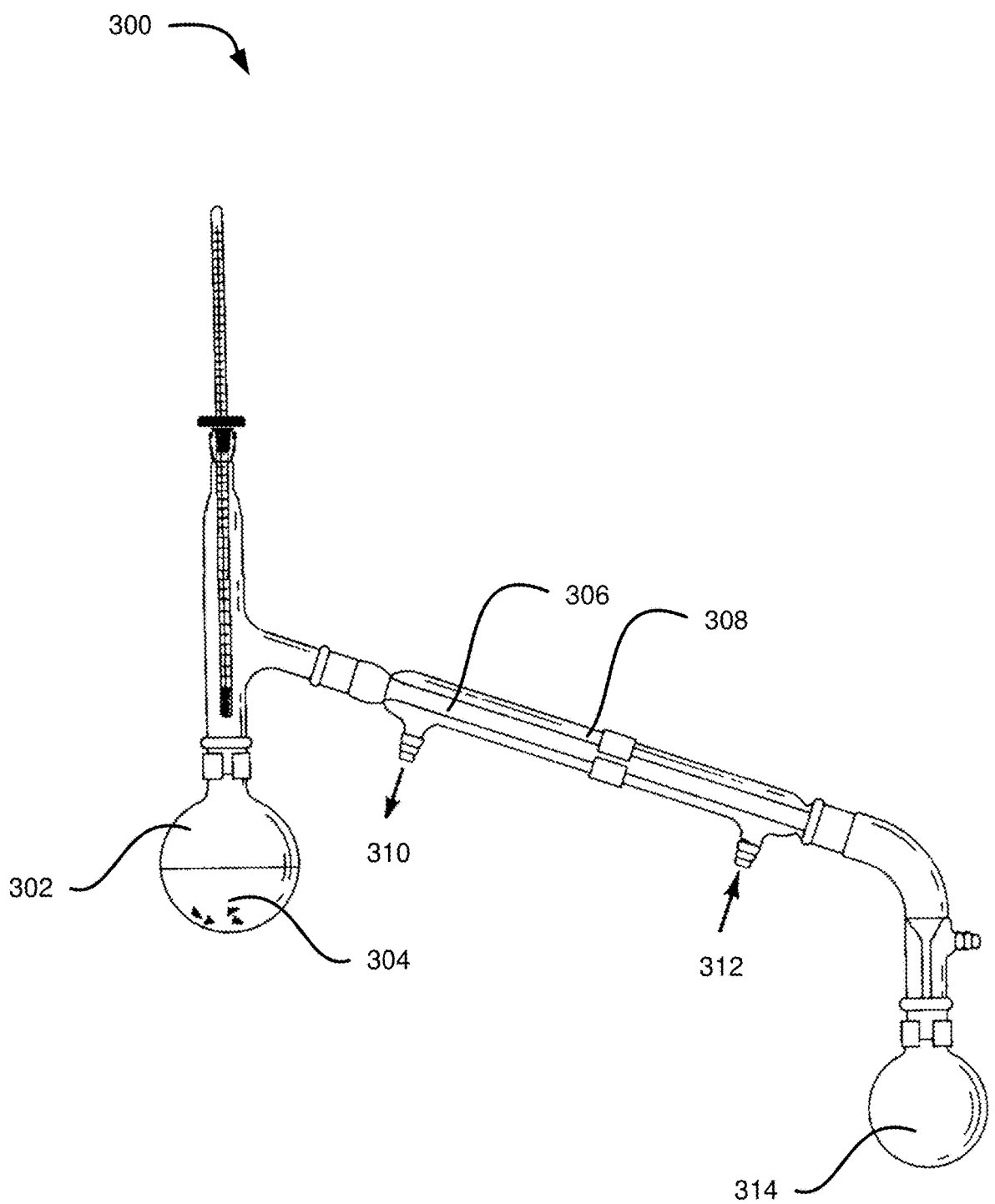
FIG. 3 illustrates an example system for steam distillation.

FIG. 3 illustrates an example system 300 for distillation. Distillation is the process of separating components or substances from a liquid mixture by using selective boiling and condensation. Distillation may result in essentially complete separation (nearly pure components), or it may be a partial separation that increases the concentration of selected components in the mixture. In either case, distillation exploits differences in the relative volatility of the mixture's components. The system 300 may be implemented to execute the first extraction 102 described in connection with FIG. 1.

The system 300 may specifically be implemented for steam distillation or hydro-distillation to extract compounds from plant material. The system 300 includes a boiling flask 302 comprising an initial fluid 304. The initial fluid 304 is heated within the boiling flask 302, and vapor from the initial fluid flows from the boiling flask 302 and into a condenser 306. The heated fluid is cooled by water (or another fluid) that circulates through the exit port 310 and intake port 312. The condensed liquid drips into the receiving flask 314, which may be sitting in a cooling bath.

The system 300 is optimized for simple distillation, but variations of the system 300 may be implemented for fractional distillation, steam distillation, vacuum distillation, short path and molecular distillation, air-sensitive vacuum distillation, zone distillation, close-system vacuum distillation, and other forms of distillation. The system 300 can be effective for extracting compounds with lighter molecular weights that can vaporize and travel through the condenser 106 to the receiving flask 314. However, the system 300 is inefficient when attempting to extract compounds with heavier molecular weights.

The system 300 for distillation may be used to extract lighter weight essential oils from a plant material. An essential oil is a concentrated hydrophobic liquid including volatile (easily evaporated at normal temperatures) chemical compounds derived from plants. Essential oils are alternatively known as volatile oils, ethereal oils, aetheroleum, or as the oil of the plant from which they are extracted, such as "oil of clove." An essential oil is essential in the sense that it includes the essence of the plant's fragrance or active compound. Essential oils include concentrated extracts harvested from plants, herbs, trees, and other material.

FIG. 4 illustrates a process flow 400 for extracting compounds comprising a higher molecular weight. The extracted compounds may be extracted from raw plant material or spent plant material. The higher-molecular-weight compounds may include, for example, diterpenes/diterpenoids or triterpenes/triterpenoids. The extracted compounds are extracted using an essential oil solvent. The extraction process 404 illustrated in FIG. 4 may be implemented as the second extraction described in connection with FIG. 1.

Terpenes are a class of natural products consisting of compounds with the formula $(C_5H_8)_n$. The terpenes class includes more than 30,000 unique compounds. Terpenes include unsaturated hydrocarbons and are predominantly produced by plants. Terpenes are further classified by the number of carbons they include. Monoterpenes $(C_{10})$ include ten carbon atoms, sesquiterpenes $(C_{15})$ include fifteen carbon atoms, diterpenes $(C_{20})$ include 20 carbon atoms, and triterpenes $(C_{30})$ include 30 carbon atoms. Many plant materials include a variety of terpenes, including lighter-weight terpenes such as monoterpenes and sesquiterpenes that can be readily extracted using ethanol-based extraction or distillation extraction methods. Plant materials may additionally include diterpenes and/or triterpenes, which have significantly higher molecular weights, and are therefore difficult to extract using traditional distillation extraction methods. Terpenoids are defined as modified class of terpenes that include different function groups and may specifically include an oxidized methyl group.

In some cases, low quantities of triterpenes/triterpenoids may be extracted using ethanol-based extraction methods. However, ethanol-based extraction is undesirable in many instances because the ethanol solvent will extract unwanted residues, organelles, pesticides, and other dark matter in addition to extracting the desired essential oils. Ethanol-based extraction introduces numerous environmental concerns and does not produce a pure essential oil output. The essential-oil based extraction methods described herein overcome the drawback associated with traditional ethanol-based extraction methods.

Commonly, terpenes/terpenoids include two, three, four, or six isoprene units; the tetraterpenes (eight isoprene units) form a separate class of compounds called carotenoids. Monoterpenes consist of two isoprene units and have the molecular formula $C_{10}H_{16}$. Examples of monoterpenes and monoterpenoids include, for example, geraniol, terpineol (present in lilacs), limonene (present in citrus fruits), myrcene (present in hops), linalool (present in lavender), honokiol (present in cypress trees), or pinene (present in pine trees). Sesquiterpenes consist of three isoprene units and have the molecular formula $C_{15}H_{24}$. Examples of sesquiterpenes and sesquiterpenoids include, for example, humulene, farnesenes, farnesol, and geosmin. Diterpenes are composed of four isoprene units and have the molecular formula $C_{20}H_{32}$. Examples of diterpenes and diterpenoids include, for example, cafestol, kahweol, cembrene, and taxadiene. Diterpenes also form the basis for biologically important compounds such as retinol, retinal, and phytol.

Sesterterpenes/sesterterpenoids have twenty-five (25) carbon atoms and five isoprene units. Sesterterpenes/sesterterpenoids are rare compared with other sizes of terpenes/terpenoids. Triterpenes/triterpenoids consist of six isoprene units and have the molecular formula $C_{30}H_{48}$. Sesquaterpenes/sesquaterpenoids are composed of seven isoprene units and have the molecular formula $C_{35}H_{56}$. Sesquaterpenes are typically microbial in their origin. Tetraterpenes/tetraterpenoids include eight isoprene units and have the molecular formula $C_{40}H_{64}$. Biologically important tetraterpenoids include acyclic lycopene, monocyclic gamma-carotene, and bicyclic alpha- and beta-carotenes. Polyterpenes/polyterpenoids consist of long chains of many isoprene units.

Triterpenoids, such as boswellic acids, exhibit strong antioxidant activity. Some triterpenoid compounds can be provided to a user to prevent or reduce the symptoms associated with inflammation-related disorders, including, for example, diabetic nephropathy, embryopathy, neuropathy, cancer, or impaired wound healing. Triterpenoids are present in numerous plants but cannot be extracted using traditional distillation methods due to the high molecular weights of these compounds. Extraction of triterpenes/triterpenoids is practiced mainly using ethanol-based extraction methods. Ethanol acts as a polar and non-polar solvent and pulls more water-soluble components from the plant. Ethanol has a relatively higher boiling point (78° C.), which makes post-extraction processing or recovery processing generally slower and more labor intensive. However, ethanol solvents present numerous cultural, environmental, and/or religious concerns for many users. It is difficult to ensure the ethanol solvent does not remain in the resultant composition, and therefore, trace amounts of the ethanol solvent will typically be provided to the end user. Additionally, the ethanol waste products present numerous environmental concerns which increase the overall cost associated with extracting the triterpenes. Overall, it is desirable to extract triterpenes and other heavier molecules from a plant material without implementing ethanol-based extraction processes.

Traditional distillation extraction methods, including distillation methods and traditional solvent-based extraction methods, can be used to extract terpenes with lower molecular weights, including monoterpenes/monoterpenoids and sesquiterpenes/sesquiterpenoids. Diterpenes/diterpenoids may additionally be extracted using traditional distillation methods, but with a lower yield even with much longer distillation process when compared with monoterpenes/monoterpenoids and sesquiterpenes/sesquiterpenoids. Traditional extraction methods are not effective for extracting meaningful quantities of heavier terpenes/terpenoids, including triterpenes/triterpenoids and other classes of biologically active compounds with heavier molecular weights like flavonoids and/or phenols.

In traditional systems, triterpenoids are extracted using an ethanol solvent. Ethanol acts as a polar and non-polar solvent and is capable of extracting more water-soluble components from a plant. Further, ethanol has a relatively high boiling point (78° C.), which makes post-extraction processing or recovery processing slow and labor intensive. The extraction methods described herein provide an improved means for extracting triterpenoids from plant material.

The process flow 400 may be implemented to extract triterpenes/triterpenoids and other compounds with higher molecular weights from a plant material. The initial composition 402 includes plant material and an essential oil solvent, which may specifically include the second plant material 108 and the essential oil solvent 114 described in connection with FIG. 1. The plant material may include raw (unaltered) plant material, spent plant material, or plant material that has been otherwise altered or processed. The plant material may include, for example, leaves, stems, bark, flowers, pollen, nectar, resin, seeds, and so forth. The essential oil solvent may include a terpene class with a lower molecular weight, such as a monoterpene/monoterpenoid or sesquiterpene/sesquiterpenoid.

The extraction process 404 may include a distillation extraction and/or solvent-based extraction process. The resultant composition 406 includes the essential oil solvent and one or more extracted compounds. The extracted compounds may include compounds with heavier molecular weights, such as diterpenes/diterpenes, triterpenes/triterpenoids, and other terpene/terpenoid classes with higher molecular weights.

The essential oil solvents described herein may include one or more molecules within the terpene class. Specifically, the essential oil solvents may include lighter-weight terpenes/terpenoids such as monoterpenes/monoterpenoids, sesquiterpenes/sesquiterpenoids, and/or diterpenes/diterpenoids. These lighter-weight terpenes may be used to extract heavier terpenes/terpenoids from a plant material. The heavier terpenes/terpenoids may include diterpenes/diterpenoids, triterpenes/triterpenoids and other heavier terpenes/terpenoids. Thus, the extraction methods described herein implement terpenes/terpenoids as a solvent to extract biologically active compounds that cannot be extracted by traditional distillation and extraction methods.

FIG. 5 is a schematic flow chart diagram of a method 500 for extracting heavier molecules from a plant in an environmentally sustainable manner. The method 500 includes preparing at 502 a solution comprising a solvent comprising an essential oil, and further comprising a solute comprising a plant material. The method includes extracting at 504 one or more compounds from the plant material by introducing one or more of heat or kinetic energy to the solution. The method 500 includes, in response to extracting the one or more compounds, filtering at 506 a resultant solution to remove solid plant material.

FIG. 6 is a schematic flow chart diagram of a method 600 for extracting heavier molecules from a plant in an environmentally sustainable manner. The method 600 includes preparing at 602 a solution comprising a solvent comprising a sesquiterpene/sesquiterpenoid and a solute comprising a plant material. The method 600 includes extracting at 604 one or more compounds from the plant material. The method 600 includes, in response to extracting the one or more compounds at 604, filtering at 606 a resultant solution to remove solid plant material.

The extraction processes described in FIGS. 5 and 6 may include permitting the plant material solute to interact with the solvent for a duration of time. The duration of time may be from about 2 hours to about 72 hours and may ideally be from about 2 hours to about 24 hours. The extraction processes may include introducing one or more of kinetic energy, microwave, sonic wave energy, or heat to the solution for at least a portion of the duration of time. The extraction processes may include maintaining the solution at room temperature, or from about 18° C. to about 24° C. The extraction processes may include maintaining the solution at an extraction temperature anywhere within a range from about −100° C. to about 1000° C. and ideally within a range from about −20° C. to about 1000° C. The extraction processes may include agitating the solution to mix a solid plant material within the liquid solvent.

The filtering processes described in FIGS. 5 and 6 may include filtering with a micron-size filter to remove fine solid plant materials may specifically include filtering with one or more of a 5-micron filter, 6-micron filter, 7-micron filter, 8-micron filter, 9-micron filter, 10-micron filter, 11-micron filter, 12-micron filter, 13-micron filter, 14-micron filter, 15-micron filter, 20-micron filter, 30-micron filter, 40-micron filter, 50-micron filter, 60-micron filter, 70-micron filter, 80-micron filter, 90-micron filter, or 100-micron filter with vacuum or centrifugation.

The methods described in FIGS. 5 and 6 may further include packaging the resultant solution. The resultant solution may be packaged and prepared in a liquid lipid-soluble formation. The resultant solution may be packaged and prepared in a dehydrated powder formation. The resultant solution may be packaged in one or more of a capsule, soft gel, tincture, water-soluble, or lipid-soluble formation as well as for formulating macroparticles, microparticles, and nanoparticles. The resultant solution may be disposed within one or more of an emollient, lotion, oil, personal care product, ingestible, or injectable product. The resultant solution may be stored within an airtight package. The resultant solution may be stored within a room temperature or chilled environment.

Monoterpene Extraction Study

An extraction study was performed to test the efficacy of the extraction methods and systems described herein. In the study, it was tested whether a solvent comprising monoterpenes/monoterpenoids can be used to extract biologically active compounds that are not extracted by distillation.

The study was implemented with a 1:2 weight ratio of solid plant material to liquid essential oils solvent. In one case, the extraction was performed for three hours, and in another case, the extraction was performed for 24 hours. The essential oil solvent includes *Boswellia carterii* raw or spent resins and *B. carterii* essential oil. Following the extraction, liquid fraction was recovered by centrifuging the mixture at 12,000 rpm for 15 minutes.

The extracts were studied for biological activities and cytotoxicity activity against a human bladder cancer cell line, J82. Results showed that extraction of *B. carterii* raw or spent resins with *B. carterii* essential oil enhanced bladder cancer cell specific cytotoxicity by two or more folds as compared to only *B. carterii* essential oil.

Turmeric Extraction Study

An extraction study was performed to test the efficacy of the extraction methods and systems described herein. In the extraction study, turmeric essential oils served as an essential oil solvent. The turmeric essential oils were disposed in solution with solid, raw turmeric powder to extract active compounds present in the turmeric root. The turmeric essential oils were subjected to chemical analysis to identify the present of additional compounds in the raw turmeric root extract.

The chemical analysis indicated that phytochemical compounds of turmeric include diarylheptanoids, a class including numerous curcuminoids such as curcumin, desmethoxycurcumin (DMC), and bisdemethoxycurcumin (BDMC). These compounds are considered to be the main active natural polyphenols founds in the rhizome of the turmeric root. Preliminary results from the extraction process demonstrated the presence of curcumin, DMC, and BDMC in the final extract, as shown in Table 1, below. Most, if not all, lipid-soluble biologically active compounds other than curcumins are extracted using the methods and systems described herein.

TABLE 1

| Quantitative measurements of curcumins in the final extract, after heavy molecules are extracted from raw turmeric root using a turmeric essential oils solvent. | | |
| --- | --- | --- |
| | Curcumin (ng/ml) | DMC (ng/ml) | BDMC (ng/ml) |
| Turmeric essential oil | 0.050 | 0.034 | 0.046 |
| Turmeric extract | 2.470 | 0.910 | 0.805 |

EXAMPLES

Example 1 is a method. The method includes preparing a solution comprising: a solvent comprising an essential oil; and a solute comprising a plant material. The method includes extracting one or more compounds from the plant material using the essential oil as part of the solvent.

Example 2 is a method as in Example 1, further comprising introducing one or more of kinetic energy, sonic wave energy, microwave or heat to the solution.

Example 3 is a method as in any of Examples 1-2, wherein at least one compound of the one or more compounds extracted from the plant material comprises a molecular weight that exceeds 250 g/mol.

Example 4 is a method as in any of Examples 1-3, wherein at least one compound of the one or more compounds extracted from the plant material comprises a molecular weight that exceeds 300 g/mol.

Example 5 is a method as in any of Examples 1-4, wherein the at least one compound of the one or more compounds extracted from the plant material comprises a molecular weight that exceeds 350 g/mol.

Example 6 is a method as in any of Examples 1-5, wherein the at least one compound of the one or more compounds extracted from the plant material comprises a molecular weight that exceeds 400 g/mol.

Example 7 is a method as in any of Examples 1-6, wherein the at least one compound of the one or more compounds extracted from the plant material comprises a molecular weight that exceeds 450 g/mol.

Example 8 is a method as in any of Examples 1-7, wherein the at least one compound of the one or more compounds extracted from the plant material comprises a molecular weight that exceeds 500 g/mol.

Example 9 is a method as in any of Examples 1-8, wherein at least one compound of the one or more compounds extracted from the plant material is a triterpene/triterpenoid.

Example 10 is a method as in any of Examples 1-9, wherein the essential oil comprises a monoterpene/monoterpenoid.

Example 11 is a method as in any of Examples 1-10, wherein the essential oil comprises a sesquiterpene/sesquiterpenoid.

Example 12 is a method as in any of Examples 1-11, further comprising extracting the essential oil from a raw plant material by way of steam/hydro distillation.

Example 13 is a method as in any of Examples 1-12, further comprising extracting the essential oil from a raw plant material by way of a solvent-based extraction method using a solvent selected from a list comprising methanol, ethanol, acetone, a hexane, a toluene, a dichloromethane, or diethyl ether.

Example 14 is a method as in any of Examples 1-13, further comprising extracting the essential oil from a raw plant material by way of carbon dioxide extraction.

Example 15 is a method as in any of Examples 1-14, further comprising extracting the essential oil from a raw plant material by way of cold-press extraction.

Example 16 is a method as in any of Examples 1-15, further comprising extracting the essential oil from a raw plant material by way of enfleurage extraction.

Example 17 is a method as in any of Examples 1-16, wherein the plant material comprises a spent plant material that has previously undergone extraction processing.

Example 18 is a method as in any of Examples 1-17, further comprising: extracting the essential oil from a raw plant material that has not previously undergone extraction processing; and in response to extracting the essential oil from the raw plant material, repurposing the raw plant material for further extraction such that the spent plant material of the solution is the same raw plant material that yielded the essential oil.

Example 19 is a method as in any of Examples 1-18, wherein the spent plant material is deficient in one or more lighter compounds due to undergoing the previous extraction processing, and wherein the one or more lighter compounds comprises a molecular weight that does not exceed 300 g/mol.

Example 20 is a method as in any of Examples 1-19, further comprising preparing the solute comprising the plant material by grinding the plant material, and wherein the plant material comprises one or more of leaves, petals, bark, wood, seeds, roots, peel, or resin derived from a plant.

Example 21 is a method as in any of Examples 1-20, wherein the solution comprises from about 25 wt. % to about 50 wt. % of the solute comprising the plant material.

Example 22 is a method as in any of Examples 1-21, wherein the solution comprises from about 20 wt. % to about 60 wt. % of the solute comprising the plant material.

Example 23 is a method as in any of Examples 1-22, wherein the solution comprises from about 30 wt. % to about 40 wt. % of the solute comprising the plant material.

Example 24 is a method as in any of Examples 1-23, wherein the solution comprises from about 50 wt. % to about 80 wt. % of the solvent comprising the essential oil.

Example 25 is a method as in any of Examples 1-24, wherein the solution comprises from about 40 wt. % to about 75 wt. % of the solvent comprising the essential oil.

Example 26 is a method as in any of Examples 1-25, wherein extracting the one or more compounds from the plant material produces a slurry comprising: the solvent comprising the essential oil; the one or more compounds extracted from the plant material, wherein the one or more compounds are dissolved in the solvent comprising the essential oil; and remaining plant material in a solid state.

Example 27 is a method as in any of Examples 1-26, further comprising filtering the slurry to remove the remaining plant material in the solid state.

Example 28 is a method as in any of Examples 1-27, wherein filtering the slurry comprises filtering with a 6-10 micron filter.

Example 29 is a method as in any of Examples 1-28, wherein filtering the slurry comprises filtering with a 10 micron filter.

Example 30 is a method as in any of Examples 1-29, wherein filtering the slurry comprises filtering with a 5-100 micron filter with filtration through vacuum or centrifugation.

Example 31 is a method as in any of Examples 1-30, wherein at least one compound of the one or more compounds extracted from the plant material comprises a molecular weight that exceeds a distillation extraction threshold, and wherein the distillation extraction threshold is a molecular weight wherein the at least one compound is not efficiently extracted by way of steam/hydro-distillation due to the steam distillation yielding less than or equal to 10% of a total amount of the at least one compound present within the plant material.

Example 32 is a method. The method includes preparing a solution comprising: a solvent comprising a sesquiterpene/sesquiterpenoid; and a solute comprising a plant material. The method includes extracting one or more compounds from the plant material using the sesquiterpene/sesquiterpenoid as part of the solvent.

Example 33 is a method. The method includes preparing a solution comprising: a solvent comprising a monoterpene/monoterpenoid; and a solute comprising a plant material. The method includes extracting one or more compounds from the plant material using the monoterpene/monoterpenoid as part of the solvent.

Example 34 is a method. The method includes preparing a solution comprising: a solvent comprising a terpene/terpenoid; and a solute comprising a plant material. The method includes extracting one or more compounds from the plant material using the essential oil as part of the solvent.

Example 35 is a method as in any of examples 32-34, further including any of the details described in connection with any of Examples 1-31.

Example 36 is a method as in any of Examples 31-35, wherein the solution includes, for example, concentrations of the solvent as follows: from about 50 wt. % to about 80 wt. % the total composition; from about 40 wt. % to about 90 wt. % the total composition; from about 30 wt. % to about 80 wt. % the total composition; from about 55 wt. % to about 80 wt. % the total composition; from about 60 wt. % to about 80 wt. % the total composition; from about 60 wt. % to about 75 wt. % the total composition; or from about 40 wt. % to about 70 wt. % the total composition.

Example 37 is a method as in any of Examples 31-36, wherein the solution includes, for example, concentrations of the solute as follows: from about 25 wt. % to about 50 wt. % the total composition; from about 20 wt. % to about 60 wt. % the total composition; from about 15 wt. % to about 65 wt. % the total composition; from about 30 wt. % to about 50 wt. % the total composition; from about 30 wt. % to about 45 wt. % the total composition; from about 35 wt. % to about 50 wt. % the total composition; or from about 35 wt. % to about 45 wt. % the total composition.

Example 38 is a method. The method includes preparing a solution comprising a solvent comprising one or more of a monoterpene/monoterpenoid or a sesquiterpene/sesquiterpenoid, and further comprising a solute comprising a plant material. The method includes extracting one or more compounds from the plant material using the solvent comprising the one or more of the monoterpene/monoterpenoid or the sesquiterpene/sesquiterpenoid.

Example 39 is a method as in Example 38, further comprising introducing one or more of kinetic energy, sonic wave energy, microwave energy, or heat to the solution.

Example 40 is a method as in any of Examples 38-39, wherein at least one compound of the one or more compounds extracted from the plant material comprises a molecular weight that exceeds 250 g/mol.

Example 41 is a method as in any of Examples 38-40, wherein at least one compound of the one or more compounds extracted from the plant material comprises a molecular weight that exceeds 300 g/mol.

Example 42 is a method as in any of Examples 38-41, wherein at least one compound of the one or more compounds extracted from the plant material is a triterpene/triterpenoid.

Example 43 is a method as in any of Examples 38-42, further comprising extracting at least a portion of the solvent from a raw plant material by way of steam distillation.

Example 44 is a method as in any of Examples 38-43, further comprising extracting at least a portion of the solvent from a raw plant material by way of a solvent-based extraction method using a solvent selected from a list comprising methanol, ethanol, acetone, a hexane, a toluene, a dichloromethane, or diethyl ether.

Example 45 is a method as in any of Examples 38-44, further comprising extracting at least a portion of the solvent from a raw plant material by way of carbon dioxide extraction.

Example 46 is a method as in any of Examples 38-45, further comprising extracting at least a portion of the solvent from a raw plant material by way of cold-press extraction.

Example 47 is a method as in any of Examples 38-46, further comprising extracting at least a portion of the solvent from a raw plant material by way of enfleurage extraction.

Example 48 is a method as in any of Examples 38-47, wherein the plant material comprises a spent plant material that has previously undergone extraction processing.

Example 49 is a method as in any of Examples 38-48, further comprising: extracting at least a portion of the solvent from a raw plant material that has not previously undergone extraction processing; and in response to extracting at least a portion of the solvent from the raw plant material, repurposing the raw plant material for further extraction such that the spent plant material of the solution is the same raw plant material that yielded at least a portion of the solvent.

Example 50 is a method as in any of Examples 38-49, wherein the spent plant material is deficient in one or more lighter compounds due to undergoing the previous extraction processing, and wherein the one or more lighter compounds comprises a molecular weight that does not exceed 300 g/mol.

Example 51 is a method as in any of Examples 38-50, further comprising preparing the solute comprising the plant material by grinding the plant material, and wherein the plant material comprises one or more of leaves, petals, bark, wood, seeds, roots, peel, or resin derived from a plant.

Example 52 is a method as in any of Examples 38-51, wherein the solution comprises from about 25 wt. % to about 50 wt. % of the solute comprising the plant material.

Example 53 is a method as in any of Examples 38-52, wherein the solution comprises from about 50 wt. % to about 80 wt. % of the solvent comprising the one or more of the monoterpene/monoterpenoid or the sesquiterpene/sesquiterpenoid.

Example 54 is a method as in any of Examples 38-53, wherein extracting the one or more compounds from the plant material produces a slurry comprising: the solvent comprising the one or more of the monoterpene/monoterpenoid or the sesquiterpene/sesquiterpenoid; the one or more compounds extracted from the plant material, wherein the one or more compounds are dissolved in the solvent; and remaining plant material in a solid state.

Example 55 is a method as in any of Examples 38-54, further comprising filtering the slurry to remove the remaining plant material in the solid state.

Example 56 is a method as in any of Examples 38-55, further comprising separating the remaining plant material in the solid state using centrifugation.

Example 57 is a method as in any of Examples 38-56, wherein at least one compound of the one or more compounds extracted from the plant material comprises a molecular weight that exceeds a distillation extraction threshold, and wherein the distillation extraction threshold is a molecular weight wherein the at least one compound is not efficiently extracted by way of steam distillation due to the steam distillation yielding less than or equal to 10% of a total amount of the at least one compound present within the plant material.

Example 58 is a method as in any of Examples 38-57, wherein the solvent comprises an essential oil, and wherein the one or more of the monoterpene/monoterpenoid or the sesquiterpene/sesquiterpenoid is a component of the essential oil.

Example 59 is a method as in any of Examples 1-58, further comprising extracting at least a portion of the solvent from a raw plant material by way of hydro-distillation extraction.

The foregoing percentages, concentrations, and ratios are presented by example only and are not intended to be exhaustive or to limit the disclosure to the precise percentages, concentrations, and ratios disclosed. It should be appreciated that each value that falls within a disclosed range is disclosed as if it were individually disclosed as set forth herein. For example, a range indicating a weight percent from about 50 wt. % to about 80 wt. % additionally includes ranges beginning or ending with all values within that range, including, for example, a range beginning at 50.1 wt. %, 50.2 wt. %, 51 wt. %, and so forth.

Example Protocols

Example Protocol 1 is a method of extracting a compound comprising a molecular weight above an extraction threshold. The method includes selecting an essential oil solvent and a plant material comprising the compound, wherein the extraction threshold is a weight wherein the compound cannot be extracted by way of steam distillation, hydro-distillation, or traditional solvent-based extraction, wherein the solvent is separated from the extracted compound when the extraction process is complete. The method includes grinding the plant material into a powder and combining the powdered plant material with the essential oil. The method includes agitating the sonicated and/or microwaved combined plant material and essential oil for 48-72 hours. The method includes passing the resultant slurry mixture through a filter to remove fine particles from the plant material with vacuum and/or centrifugation.

Example Protocol 2 is a method of extracting a compound comprising a molecular weight above an extraction threshold. The method includes weighing a desired amount of a composition comprising one or more essential oils. The method includes weighing a desired amount of one or more plant materials. The method includes disposing the one or more plant materials in a solution comprising the one or more essential oils. The method includes introducing kinetic energy to the solution comprising the one or more plant materials and the one or more essential oils.

Example Protocol 3 is a method of extracting a compound comprising a molecular weight above an extraction threshold. The method includes weighing a desired amount of a composition comprising one or more essential oils. The method includes weighing a desired amount of one or more plant materials. The method includes disposing the one or more plant materials in a solution comprising the one or more essential oils. The method includes introducing heat to the solution comprising the one or more plant materials and the one or more essential oils.

Example Protocol 4 is a method of extracting a compound comprising a molecular weight above an extraction threshold. The method includes weighing out a desired quantity of an essential oil and disposing the essential oil in an appropriate size of container or reactor. The method includes weighing out a desired quantity of raw plant materials or spent biomass which has been processed for essential oil extraction. The weight of the plant materials is about 0.7× the weight of the essential oils. The method includes grinding the plant materials into a powder form and placing the ground plant materials into the container or reactor with the essential oils. The method includes sonicating the essential oil and plant material for 30 or more minutes at room temperature. The method includes performing extraction by constant stirring on a magnetic stirrer or a reactor at room temperature for 24 hours. The method includes, following extraction, passing the resultant slurry mixture through a 40-micron to 60-micron pore size filter to remove fine particles form the plant material. The method includes weighing a liquid portion passing through the filter with vacuum and/or centrifugation to calculate the yield. The method includes identifying lipid-soluble, biologically active compounds with "heavy" molecular weight, including vitamins, carotenoids, flavonoids, phenolic acids, stilbenes, and others.

Example Protocol 5 is a method of extracting a compound comprising a molecular weight above an extraction threshold. The extraction threshold is a maximum molecular weight that can be extracted using steam distillation. The method includes disposing an essential oil solvent and a spent plant material in a container or reactor. The method includes introducing one or more of kinetic energy, sonic wave energy, microwave or heat to the reactor. The method includes maintaining the essential oil solvent and the spent plant material in solution for an extraction time from about 2 hours to about 24 hours. The method includes maintaining the extraction solution within a temperature range from about −20° C. to about 1000° C. The method includes filtering the solution to separate lipid-soluble liquid components from solid plant materials with vacuum and/or centrifugation. The method includes packaging the resultant lipid-soluble liquid compounds in one or more of a liquid lipid-based formulation or a powder formulation.

Example Protocol 6 is a method for extracting one or more of a diterpene/diterpenoid or a triterpene/triterpenoid from a plant material. The method includes disposing an essential oil solvent and a spent plant material in a container or reactor. The method includes causing the essential oil solvent to extract one or more of the diterpene/diterpenoid and/or of the triterpene/triterpenoid from the plant material through one or more of introducing energy to the solution or permitting the solution to rest for an extraction time from about 2 hours to about 24 hours. The method includes filtering the resultant solution to separate the diterpene/diterpenoid and/or triterpene/triterpenoid from solid plant materials.

Example Protocol 7 is a method of extracting a compound comprising a molecular weight above an extraction threshold. The extraction threshold is a maximum molecular weight that can be extracted using steam/hydro-distillation. The method includes disposing an essential oil solvent and a spent plant material in a container or reactor. The method includes introducing microwave energy to the reactor. The method includes maintaining the essential oil solvent and the spent plant material in solution for an extraction time from about 2 hours to about 24 hours. The method includes maintaining the extraction solution within a temperature range from about −20° C. to about 1000° C. The method includes filtering the solution to separate lipid-soluble liquid components from solid plant materials with vacuum and/or centrifugation. The method includes packaging the resultant lipid-soluble liquid compounds in one or more of a liquid lipid-based formulation, emulsified water-lipid formulation, or a powder formulation.

Example Protocol 8 is any of the Example Protocols 1-7, wherein the method of extracting a compound comprising a molecular weight above an extraction threshold wherein the essential oil solvent is extracted using hydro-distillation.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A method for extraction comprising:
   preparing a solution comprising:
      a solvent comprising an essential oil; and
      a solute comprising a plant material; and
   extracting a compound from the plant material using the essential oil as part of the solvent;
   wherein the compound extracted from the plant material comprises a phenolic acid and a flavonoid.

2. The method of claim 1, further comprising introducing one or more of kinetic energy, sonic wave energy, microwave energy, or heat to the solution.

3. The method of claim 1, wherein at least one compound of the one or more compounds extracted from the plant material comprises a weight average molecular weight that exceeds 250 g/mol.

4. The method of claim 1, wherein at least one compound of the one or more compounds extracted from the plant material comprises a weight average molecular weight that exceeds 300 g/mol.

5. The method of claim 1, wherein the compound extracted from the plant material further comprises one or more of a triterpene or a triterpenoid.

6. The method of claim 1, wherein the essential oil comprises one or more of a monoterpene or a monoterpenoid.

7. The method of claim 1, wherein the essential oil comprises one or more of a sesquiterpene or a sesquiterpenoid.

8. The method of claim 1, further comprising extracting the essential oil from a raw plant material by way of one or more of steam distillation or hydro-distillation.

9. The method of claim 1, further comprising extracting the essential oil from a raw plant material by way of a solvent-based extraction method using a solvent selected from a list comprising methanol, ethanol, acetone, a hexane, a toluene, a dichloromethane, or diethyl ether.

10. The method of claim 1, further comprising extracting the essential oil from a raw plant material by way of carbon dioxide extraction.

11. The method of claim 1, further comprising extracting the essential oil from a raw plant material by way of cold-press extraction.

12. The method of claim 1, further comprising extracting the essential oil from a raw plant material by way of enfleurage extraction.

13. The method of claim 1, wherein the plant material comprises a spent plant material that has previously undergone extraction processing.

14. The method of claim 13, further comprising:
   extracting the essential oil from a raw plant material that has not previously undergone extraction processing; and
   in response to extracting the essential oil from the raw plant material, repurposing the raw plant material for further extraction such that the spent plant material of the solution is the same raw plant material that yielded the essential oil.

15. The method of claim 13, wherein the spent plant material is deficient in one or more lighter compounds due to undergoing the previous extraction processing, and wherein the one or more lighter compounds comprises a weight average molecular weight that does not exceed 300 g/mol.

16. The method of claim 1, further comprising preparing the solute comprising the plant material by grinding the plant material, and wherein the plant material comprises one or more of leaves, petals, bark, wood, seeds, roots, peel, or resin derived from a plant.

17. The method of claim 1, wherein the solution comprises from about 25 wt. % to about 50 wt. % of the solute comprising the plant material.

18. The method of claim 1, wherein the solution comprises from about 50 wt. % to about 80 wt. % of the solvent comprising the essential oil.

19. The method of claim 1, wherein extracting the one or more compounds from the plant material produces a slurry comprising:

the solvent comprising the essential oil;

the one or more compounds extracted from the plant material, wherein the one or more compounds are dissolved in the solvent comprising the essential oil; and remaining plant material in a solid state.

20. The method of claim 19, further comprising filtering the slurry to remove the remaining plant material in the solid state.

21. The method of claim 19, further comprising separating the remaining plant material in the solid state using centrifugation.

22. The method of claim 1, wherein at least one compound of the one or more compounds extracted from the plant material comprises a molecular weight that exceeds a distillation extraction threshold, and wherein the distillation extraction threshold is a molecular weight wherein the at least one compound is not efficiently extracted by way of steam distillation due to the steam distillation yielding less than or equal to 10% of a total amount of the at least one compound present within the plant material.

23. The method of claim 1, further comprising extracting the essential oil from a raw plant material by way of hydro-distillation.

\* \* \* \* \*